Oct. 19, 1965  T. M. DEAKIN  3,212,403
GEAR GENERATING MACHINES
Filed Nov. 1, 1962  3 Sheets-Sheet 1
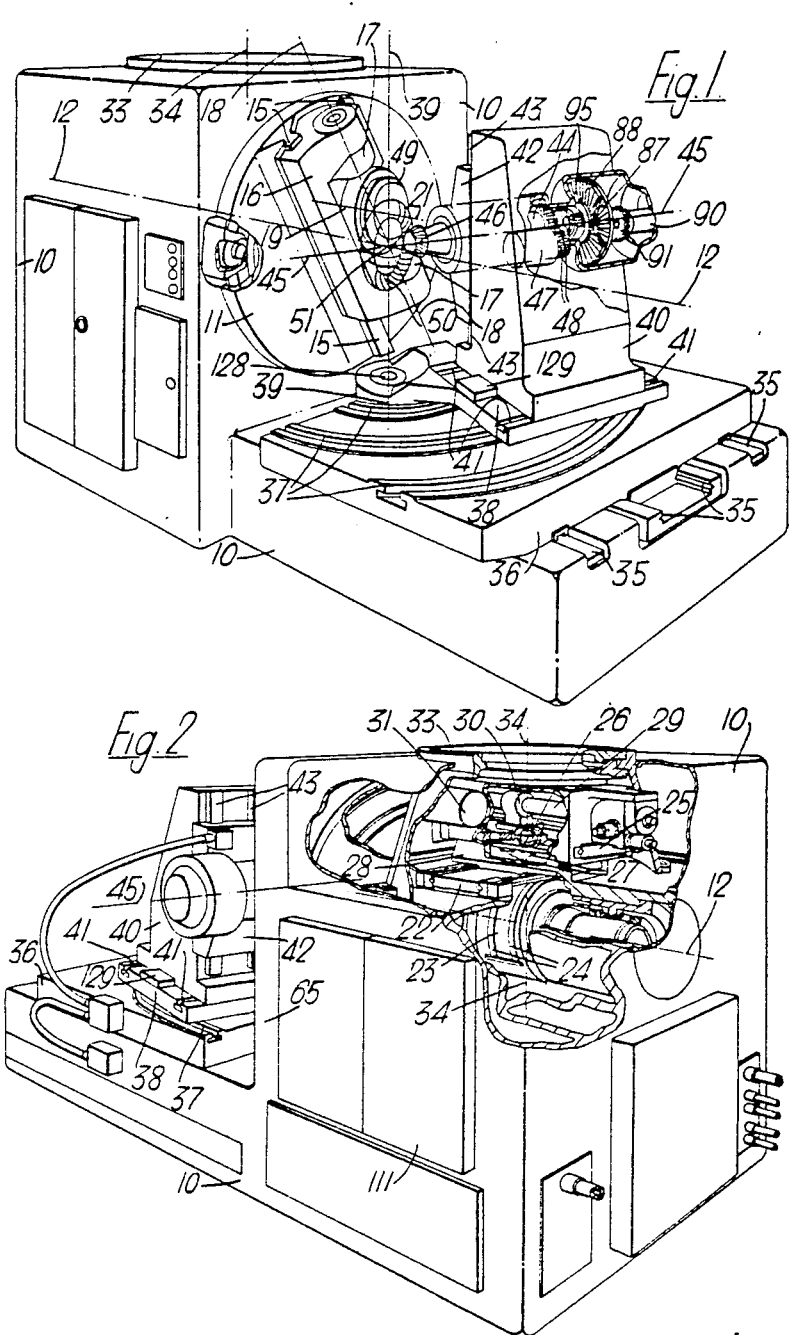
Inventor
THOMAS MEYRICK DEAKIN
By Norris + Bateman
Attorneys

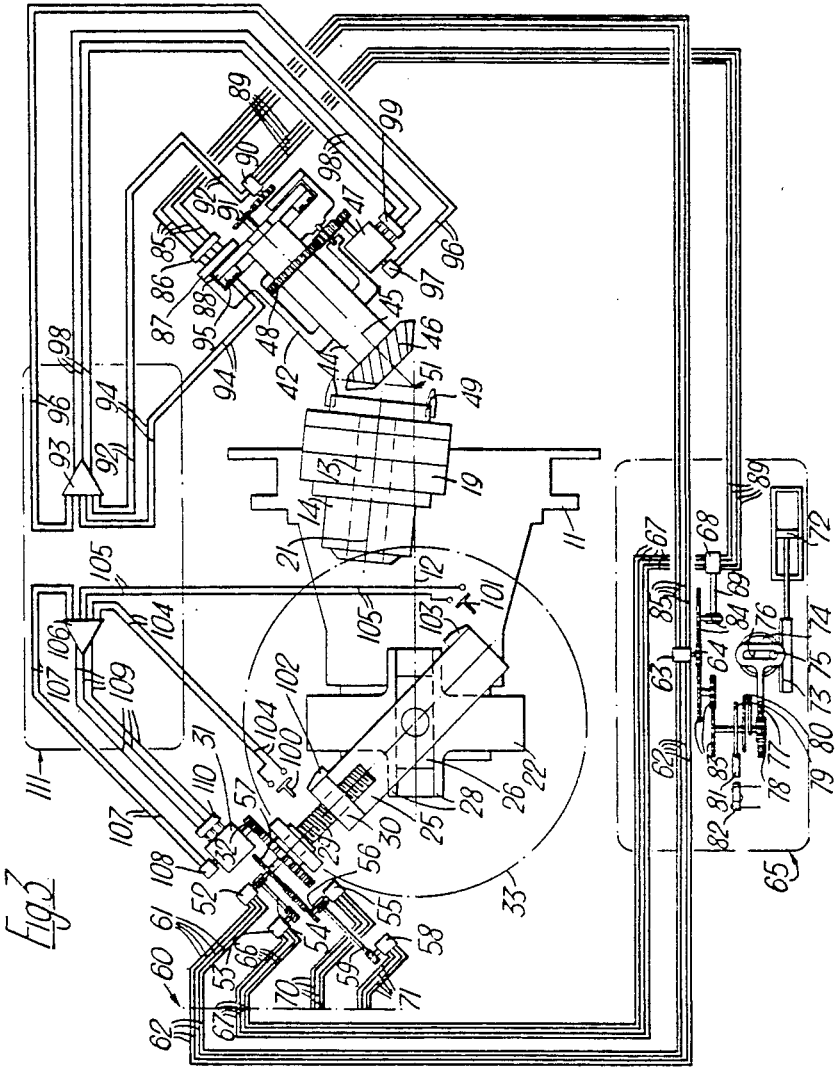

Inventor
THOMAS MEYRICK DEAKIN
By Morris + Bateman
Attorneys

United States Patent Office
3,212,403
Patented Oct. 19, 1965

3,212,403
GEAR GENERATING MACHINES
Thomas Meyrick Deakin, Altrincham, England, assignor to David Brown Industries Limited
Filed Nov. 1, 1962, Ser. No. 234,701
Claims priority, application Great Britain, Nov. 10, 1961, 40,265/61
16 Claims. (Cl. 90—3)

The invention relates to machines for generating bevel and hypoid gears, and has for one of its objects to provide a mechanically simplified machine for generating such gear. A further object is to enable gears of a high degree of accuracy to be produced.

According to the invention, a machine for generating bevel and hypoid gears comprises a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, and means connected between the second reciprocable slide and the other of said member for rolling said other of said members about its axis. The ratio of roll between the work spindle member and the tool cradle member is preferably variable from 1:1 to 1:0. Preferably, the means connected between the second reciprocable slide and said other of said members for rolling said other of said members about its axis comprise remote control means. The remote control means preferably include electrical means. Preferably, also, the axis of the tool cradle member is fixed and the axis of the work spindle member is angularly adjustable with respect thereto, the first reciprocable slide is coupled in non-slip relation to the tool cradle member, and the second reciprocable slide is adapted to reciprocate the first reciprocable slide and is angularly adjustable with respect to said first reciprocable slide for varying the amplitude of reciprocation of said first reciprocable slide.

In the accompanying drawings, which are by way of example only:

FIG. 1 is a cut-away perspective view on one corner of a preferred machine according to the invention;

FIG. 2 is a cut-away perspective view on the opposite corner of the machine;

FIG. 3 is a diagrammatic plan view of the machine showing the electrical means thereof;

Figure 4:
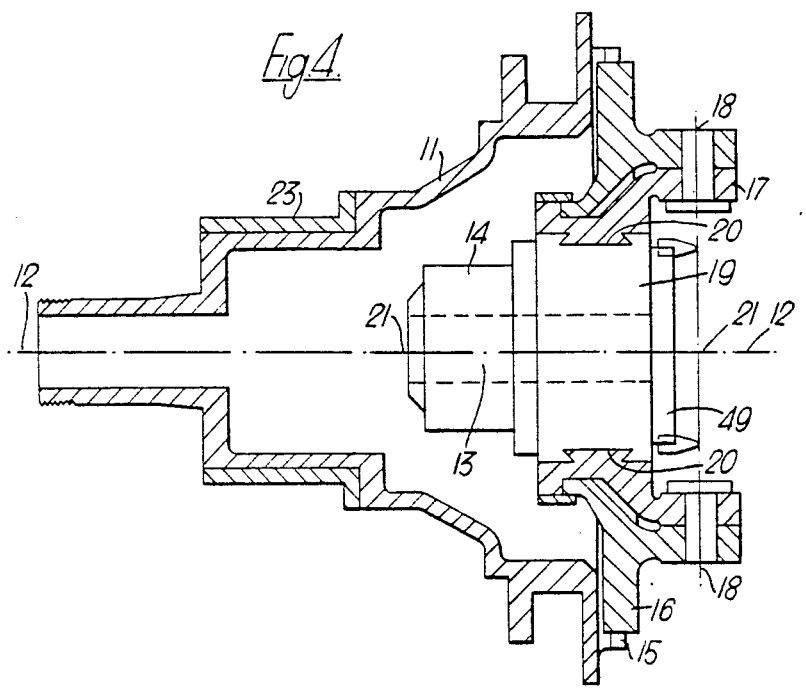
FIG. 4 is a section through the cutter cradle of the machine in a plane containing the axes 12 and 18.

Referring now to FIGS. 1 to 4 of the drawings, a machine for generating curved tooth bevel and hypoid gears comprises a bed 10 in which a cutter cradle 11 is adapted to be rolled in known manner about a fixed horizontal axis 12. Mounted in the cutter cradle 11 for angular and eccentric adjustment relative to the cutter cradle axis 12 is a cutter spindle 13 which is rotatable by means of a hydraulic motor 14. To enable such adjustments to be effected, the cutter cradle 11 is provided with rectilinear guides 15 disposed in a plane perpendicular to its axis 12. Adjustable along the guides 15 is a cutter slide 16 on which a trunnioned member 17 is angularly adjustable about an axis 18 parallel to said guides and intersecting the cutter cradle axis 12. A cutter spindle housing 19, in which the cutter spindle 13 is journalled, is slidably adjustable in rectilinear guides 20 (see FIG. 4) in the trunnioned member 17, in a direction perpendicular to the axis 18. The axis 21 of the cutter spindle 13 is disposed at right angles to the direction in which the cutter spindle housing 19 is slidably adjustable, and thus said axis can be moved to either side of a position in which it is radial to the axis 18. Means for rolling the cutter cradle 11 comprise a first reciprocable slide 22 disposed at right angles to the cutter cradle axis 12 and tangentially of a drum 23 secured to the cutter cradle 11 in co-axial relation thereto. Said slide is coupled in non-slip relation to the drum 23 by means of flexible steel tapes 24. The slide 22 is reciprocated by a second reciprocable slide 25 carrying a trunnion block 26 provided with rollers 27 facilitating the sliding of said block in guides 28 which are secured to the slide 22 and extend perpendicularly to the direction of reciprocation of said slide. The slide 25 is reciprocated by an axially fixed rotatable screw 29 engaging with a nut 30 secured to said slide, and said screw is driven by a reversible hydraulic motor 31 through reduction gearing 32. The screw 29 and nut 30 are of the recirculating ball type. The slide 25, the screw 29, and the hydraulic motor 31 and reduction gearing 32 for driving said screw are carried by a turret 33 which is angularly adjustable about a vertical axis 34 intersecting the axis 12 to enable the amplitude of reciprocation of the slide 22 to be varied. Thus in one extreme angular position of the slide 25, parallel to the slide 22, the amplitude of reciprocation of the slide 22 is the same as that of the slide 25, whilst in the other extreme angular position of the slide 25, at right angles to the slide 22, reciprocation of the slide 25 does not cause any reciprocation of the slide 22.

Adjacent that end of the cutter cradle 11 at which the cutter spindle 13 is mounted, and below the level of the cutter cradle axis 12, the bed 10 is provided with rectilinear guides 35 which are disposed in a horizontal plane and extend in a direction parallel to said axis. An infeed slide 36 is movable in said guides, by means of a hydraulic jack (not shown), towards and away from the cutter cradle 11, and is provided on its horizontal upper surface with T-slots 37 for clamping in adjusted position a sub-slide 38 which is angularly adjustable about a pivot pin 128 carried by that end of the infeed slide 36 adjacent the cutter cradle 11, the axis 39 of said pivot pin lying in the vertical plane which includes the cutter cradle axis 12. A workhead support bracket 40 is adjustable along rectilinear guides 129 on the horizontal upper surface of the sub-slide 38, and said surface is provided with T-slots 41 for clamping the workhead support bracket in adjusted position. A workhead 42 is adjustable along rectilinear guides 43 disposed in a vertical plane on the workhead support bracket 40. The plane including the guides 43 is parallel to the direction in which the workhead support bracket 40 is adjustable. A horizontal work spindle 44 is journalled in the workhead 42 with its axis 45 parallel to the direction in which the workhead support bracket 40 is adjustable and radial to the axis 39, and that end of the work spindle 44 adjacent the cutter cradle 11 is adapted to carry a gear blank 46. The work spindle 44 is driven by a reversible hydraulic motor 47 through reduction gearing 48, said motor being carried by the workhead 42 and housed within the workhead support bracket 40.

The arrangement is such that a face mill cutter 49 secured to the cutter spindle 13 can be set to sweep out one tooth flank surface of an imaginary basic crown wheel 50 co-axial with the cutter cradle 11 whilst the gear blank 46 carried by the work spindle 44 can be set with its axis 45 inclined at the requisite angle to the cutter cradle axis 12 and with its pitch cone apex coincident with, or radially offset from, the pitch cone apex 51 of said wheel depending on whether a bevel or hypoid gear is to be generated. Alternatively, if it is desired to generate a bevel or hypoid pinion to mesh with a non-generated wheel, the face mill cutter 49 is set to sweep out a surface corresponding to one tooth flank surface of the non-generated wheel if said wheel were co-axial with the cutter cradle 11 whilst the pinion blank 46 is set with its axis 45 inclined at the requisite angle to the cutter cradle axis 12 and with its pitch cone apex coincident with, or radially offset from, the pitch cone apex of the surface swept out by the cutter. Depending on the profile of the cutter employed, gears can be generated from a basic crown tooth having either a conventional straight sided profile or a curved profile, for example the profile of the cutter can be such that it sweeps out a surface consisting of a zone of a sphere.

The slide 25 is connected to the work spindle 44 by remote control means which include electrical means. Said remote control means are arranged as follows:

A resolver 52 is drivably connected directly to the axially fixed rotatable screw 29 which reciprocates the slide 25, and a resolver 53 is drivably connected to said screw by way of reduction gearing 54 having an overall ratio of, say, 180:1. A resolver 55 having an input shaft 56 is drivably connected to the screw 29 by way of increasing gearing 57 having an overall ratio of, say, 3:1, and a resolver 58 is drivably connected to the shaft 56 by way of reduction gearing 59 having an overall ratio equal to that of the gearing 54. A multiple-pole changeover switch (not shown) is provided at a point 60. When said switch is in one position, the resolver 52 is connected electrically by four wires 61 and four wires 62 to a resolver 63 driven by an output shaft 64 of an index gearbox indicated generally at 65, whilst the resolver 53 is connected electrically by four wires 66 and four wires 67 to a resolver 68 driven by another output shaft 69 of said gearbox. When the multiple-pole change-over switch is in its other position, the resolver 55 is connected electrically by four wires 70 and the four wires 62 to the resolver 63, whilst the resolver 58 is connected electrically by four wires 71 and the four wires 67 to the resolver 68. The speed ratio between the resolver 63 and the resolver 68 is the same as that between the resolver 52 and the resolver 53 and that between the resolver 55 and the resolver 58. The index gearbox 65 is actuated by means of a hydraulic jack 72 in timed relation with movement of the infeed slide 36 away from the cutter cradle 11, and can be located at any convenient point on or remote from the machine. The jack 72 reciprocates a toothed rack 73 meshing with a gear 74 which carries a radially adjustable crank pin 75. Said pin co-operates with a slot 76 in a member formed at one end of a toothed rack 77, the slot being disposed at right angles to the direction of reciprocation of said rack. A gear 78 meshes with the rack 77 and drives a peripherally slotted index disc 79 by way of ratchet mechanism 80. An index peg 81 for locking the disc 79 in angularly adjusted position is operated by a solenoid 82. The index disc is drivably connected to the shaft 64 by change gears 83, and the shafts 64 and 69 are interconnected by reduction gearing 84 having an overall ratio equal to that of the gearing 54 and that of the gearing 59. The resolver 63 is connected electrically by four wires 85 to an impedance converter 86 which is in turn connected electrically to the stator 87 of an inductosyn, said stator being co-axial with the work spindle 44 which carries the rotor 88 of the inductosyn. The resolver 68 is connected electrically by four wires 89 to a resolver 90 drivably connected to the work spindle 44 by gearing 91 having a 1:1 ratio. The resolver 90 is connected electrically by two wires 92 to a servo amplifier 93 to which there are also connected electrically by two wires 94 and a slip ring 95 the rotor 88 of the inductosyn and by two wires 96 a tachometer 97 drivably connected directly to the hydraulic motor 47 for driving the work spindle 44. The servo amplifier 93 is connected electrically by three wires 98 to valve means 99 for controlling the speed and the direction of rotation of the hydraulic motor 47. Limit switches 100, 101 for controlling the amplitude of reciprocation of the slide 25 are arranged to be actuated by respective oppositely inclined cam blocks 102, 103 adjustably secured to said slide. Said limit switches are connected electrically by respective pairs of wires 104, 105 to a servo amplifier 106, to which there is also connected electrically by two wires 107 a tachometer 108 drivably connected directly to the hydraulic motor 31 for driving the screw 29. The servo amplifier 106 is connected electrically by three wires 109 to valve means 110 for controlling the speed and direction of rotation of said hydraulic motor. The servo amplifiers 93 and 106 are contained in a cabinet 111 (see FIG. 2) which could equally well be remote from the machine.

Each of the resolvers employed in the control system described above are of like conventional construction, and each essentially comprises a single motor rotor winding (not shown) and a pair of mutually perpendicular motor stator windings (not shown). The operation of these resolvers is well known. If separate signal voltages are applied to the two resolver stator windings, the signal voltages produced in the resolver rotor winding to drive the rotor shaft will be the vectorial resultant of the stator signal voltages. If a signal voltage is applied to the rotor winding, the signal voltages produced in the stator windings will correspond to the sine and cosine of the instantaneous angular position of the rotor since the stator windings are perpendicular.

The inductosyn 87 is essentially a reversely operated resolver. The impedance converter 86 is also of known construction and comprises a transformer preferably of the toroidal type.

When gears of large or intermediate cone angle are to be generated, the work spindle 44 is set at the required angle to the cutter cradle axis 12, the slide 25 is set relative to said axis at the complement of said angle, and the multiple-pole change-over switch is positioned to connect the wires 61 to the wires 62 and the wires 66 to the wires 67. The remote control means operate to roll the work spindle 44 in precisely the required ratio relative to the rolling of the cutter cradle 11 and to index the gear blank 46 on the completion of each tooth gap therein during a withdrawal of said blank out of engagement with the cutter 49 by movement of the infeed slide 36 away from the cutter cradle 11. When indexing of the blank 46 has been effected the infeed slide 36 returns it into engagement with the cutter 49. The angular disposition of the work spindle 44 about its axis 45 relative to the angular disposition of the cutter cradle 11 about its axis 12 is controlled continuously by the resolver 52 and the inductosyn 87, 88 over a fine range of movement and by the resolvers 53 and 90 over a coarse range of movement. Where the speed ratio between the resolvers 52 and 53 is, say, 180:1, the fine range is from 2 degrees to zero and the coarse range is divided into increments of 2 degrees. That is to say, the resolvers 53 and 90 operate to prevent the work spindle 44 and the cutter cradle 11 from rolling out of phase with one another by multiples of 2 degrees. Indexing of the work spindle 44 about its axis 45 by a predetermined angular amount on the completion of each tooth flank in the gear blank 46, to ensure that the next tooth flank to be generated has the correct pitch relationship to the previously generated tooth flanks, is controlled by the resolver 63 over a fine range of movement and by the resolver 68 over a coarse range of movement. Where the speed ratio between the resolvers 52 and 53, and thus between the resolvers 63 and 68, is, say, 180:1, said fine range is from 2 degrees to zero and said coarse range is divided into increments of 2 degrees. That is to say, the resolver 68 prevents the work spindle 44 being inaccurately indexed by multiples of 2 degrees.

When it is desired to generate gears of small cone angle which would otherwise require unduly long strokes of the slide 25, the multiple-pole change-over switch is positioned to connect the wires 70 to the wires 62 and the wires 71 to the wires 67, and the work spindle 44 is set at the required angle to the cutter cradle axis 12. The angular setting of the slide 25 relative to said axis is no longer the complement of said angle but is determinedly larger than said complement. Thus, due to the change over from the resolvers 52 and 53 to the resolvers 55 and 58, the required roll ratio is obtained without the length of stroke of the slide 25 being unduly long.

Figure 5:
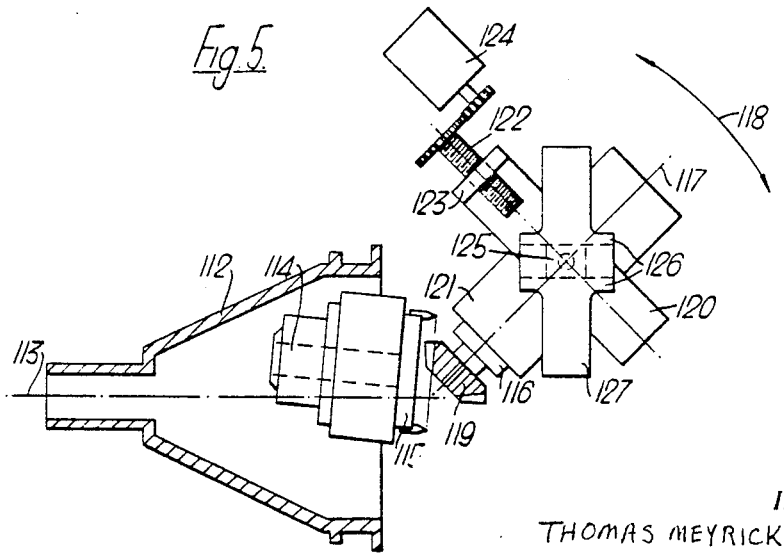
FIG. 5 is a diagrammatic plan view of a modified machine according to the invention.

Referring now to FIG. 5 of the drawings, a modified machine for generating curved tooth bevel and hypoid gears comprises a cutter cradle 112 adapted to be rolled about a fixed horizontal axis 113. Adjustably mounted in the cutter cradle 112 is a rotatable cutter spindle 114 adapted to have a face mill cutter 115 secured to it. A work spindle 116 is adapted to be rolled about an axis 117 which is angularly adjustable, relative to the axis 113, in a horizontal plane as indicated by the arrow 118. The work spindle 116 is adapted to carry a gear blank 119. Means for rolling the work spindle 116 comprise a first reciprocable slide 120 disposed at right angles to the axis 117 and tangentially of a drum 121 secured to the work spindle 116 in co-axial relation thereto. Said slide is coupled in non-slip relation to the drum 121 by means of flexible steel tapes (not shown). The slide 120 is reciprocated by an axially fixed rotatable screw 122 engaging with a nut 123 secured to said slide, and said screw is driven by a reversible hydraulic motor 124. A trunnion block 125 carried by the slide 120 is slidable in guides 126 formed in a second reciprocable slide 127. The slide 127 is reciprocable in a fixed direction at right angles to the axis 113, and the guides 126 extend perpendicularly to the direction of reciprocation of said slide. The slide 120, the screw 122 and the hydraulic motor 124 are angularly adjustable together with the work spindle 116 and the drum 121. Electrical, photo-electric, electronic, hydraulic or mechanical means (not shown) are provided for rolling the cutter cradle 112 through an angle proportional to the amplitude of reciprocation of the slide 127.

Inter alia, the following modifications are possible: The electrical means employed in the preferred embodiment can be replaced by photo-electric means utilising the Moire Fringe principle, or by electronic, hydraulic or mechanical means. Bevel and hypoid gears having straight teeth can equally well be generated by providing the cutter cradle with reciprocatory cutters instead of a face mill cutter. The machine can be provided with a grinding wheel or wheels instead of a cutter or cutters, for finishing workpieces consisting of previously cut bevel and hypoid gears. The face mill cutter can be replaced by twin face mill cutters of equal radius to one another, mounted eccentrically of one another in intermeshing relationship and rotatable in timed relation, one of said cutters being adapted to sweep out one flank surface of a tooth of the imaginary basic crown wheel, or of a non-generated wheel if said wheel were co-axial with the cutter cradle, and the other of said cutters being adapted to sweep out the other flank surface of the same tooth of the imaginary basic crown wheel or of said non-generated wheel, so that both cutters are adapted to operate simultaneously in one tooth space of the gear blank. The flexible steel tapes and the drum to which they are connected can be replaced by toothed rack and pinion means, at the risk of introducing backlash into the roll producing means.

What I claim is:

1. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

2. A machine according to claim 1, wherein the ratio of roll between the work spindle member and the tool cradle member is variable from 1:1 to 1:0.

3. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means including electrical means connected between the second reciprocable slide and the other of said members for rolling said other of said members about its axis, and indexing means operatively interposed in said remote control means for modifying the motion of said other member by intermittently imparting thereto a further predetermined movement about its axis.

4. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to the same as the angular relationship between the axes of the tool cradle member and the work spindle member, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

5. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for making the acute angle between the first and second reciprocable slides equal to the acute angle between the axes of the tool cradle member and the work spindle member when gears of large or intermediate cone angle are to be generated and for making the acute angle between the first and second reciprocable slides predeterminedly smaller than the acute angle between the axes of the tool cradle member and the work spindle member when gears of small cone angle are to be generated, remote control means connected between the second reciprocable slide and the other of said members for rolling said other of said members about its axis, the last mentioned means being arranged to compensate for the difference in said acute angles, and thus to produce the correct ratio of roll between the two members, when gears of small cone angle are to be generated, and indexing means operatively interposed in said remote control means for modifying the motion of said other member by intermittently imparting thereto a further predetermined movement about its axis.

6. A machine for generating bevel and hypoid gears comprising a tool cradle member, a work spindle member, means for angularly adjusting the axis of one of said members relative to the axis of the other, a first reciprocable slide coupled in non-slip relation by means of flexible steel tapes to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

7. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, a reversible hydraulic motor for reciprocating said one of said slides, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

8. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, a reversible hydraulic motor drivably connected to an axially fixed rotatable screw engaging with a nut secured to said one of said slides, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

9. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, a reversible hydraulic motor drivably connected to said other of said members, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

10. A machine for generating bevel and hypoid gears comprising a tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, a reversible hydraulic motor for reciprocating said one of said slides, a reversible hydraulic motor drivably connected to said other of said members, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, valve means actuated by the remote control means for controlling the speed and direction of rotation of the hydraulic motor for reciprocating said one of said slides, valve means actuated by the remote control means for controlling the speed and direction of rotation of the hydraulic motor drivably connected to said other of said members, and indexing means operatively interposed in said remote control means for modifying the motion of said other member by intermittently imparting thereto a further predetermined movement about its axis.

11. A machine for generating bevel and hypoid gears comprising a tool cradle member, a rotatable cutter spindle carried adjustably by the tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

12. A machine for generating bevel and hypoid gears comprising a tool cradle member, a rotatable cutter spindle carried adjustably by the tool cradle member, a hydraulic motor drivably connected to the rotatable cutter spindle, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

13. A machine for generating bevel and hypoid gears comprising a tool cradle member, two rotatable cutter spindles mounted eccentrically of one another and carried adjustably by the tool cradle member, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

14. A machine for generating bevel and hypoid gears comprising a tool cradle member, two rotatable cutter spindles mounted eccentrically of one another and carried adjustably by the tool cradle member, a hydraulic motor drivably connected to the two rotatable cutter spindles, a work spindle member, means for angularly adjusting the axis of one of said members relative to the axis of the other, a first reciprocable slide coupled in non-slip relation to one of said members for rolling said one of said members about its axis, a second reciprocable slide, means enabling one of said reciprocable slides to reciprocate the other, means for adjusting the angular relationship between the first and second reciprocable slides to vary the ratio of the amplitudes of reciprocation of said reciprocable slides, remote control means connected between the second reciprocable slide and the other of said members for rolling said other of said members about its axis, and indexing means operatively interposed in said remote control means for modifying the motion of said other member by intermittently imparting thereto a further predetermined movement about its axis.

15. A machine for generating bevel and hypoid gears comprising a tool cradle member having a fixed axis, a work spindle member, means for angularly adjusting the axis of the work spindle member with respect to the axis of the tool cradle member, a first reciprocable slide coupled in non-slip relation to the tool cradle member for rolling said member about its axis, a second reciprocable slide adapted to reciprocate the first reciprocable slide, means for angularly adjusting the second reciprocable slide with respect to the first reciprocable slide for varying the amplitude of reciprocation of the first reciprocable slide, remote control means connected between the second reciprocable slide and the work spindle member for rolling said member about its axis, and workpiece indexing means interposed in said remote control means for modifying the motion of work spindle member by intermittently imparting thereto a further predetermined movement about its axis.

16. A machine for generating bevel and hypoid gears comprising a rotatably mounted tool cradle member, a gear cutter carried by said tool cradle member, a work spindle member for mounting a gear blank, a work feed slide rotatably mounting said work spindle member, means mounting said work feed slide for reciprocal movement axially with respect to the rotational axis of said tool cradle member to enable said gear blank to be moved into and out of engagement with said cutter, a first reciprocable slide drive coupled to roll said tool cradle member about its rotational axis, a second reciprocable slide drive connected to said first reciprocable slide, motor means enabling reciprocation of one of said reciprocable slides to reciprocate the other and to rotate said tool cradle member, means for adjusting the angular relationship between said first and second reciprocable slides to vary the ratio of the amplitudes of reciprocation of said reciprocable slides, remote control means including electrical means operatively connected between said second reciprocable slide and said work spindle member for rotating said work spindle member in predetermined timed relation with said tool cradle member, means for reciprocating said feed slide to cyclically engage said gear blank with said cutter and to withdraw said gear blank from said cutter, and indexing means operatively incorporated in said remote control means and being actuatable in timed relation with the movement of said feed slide to index said gear blank during the interval when said blank is withdrawn from said cutter after the completion of each tooth gap.

References Cited by the Examiner
UNITED STATES PATENTS 2,725,792  12/55  Wildhaber _____ 90—5

FOREIGN PATENTS 571,877  6/59  Canada.
597,013  1/48  Great Britain.

ANDREW R. JUHASZ, *Primary Examiner.*

LEON PEAR, *Examiner.*